United States Patent [19]
Rosenburg

[11] Patent Number: 4,910,908
[45] Date of Patent: Mar. 27, 1990

[54] WATER SOLUBLE FISHING LINE WEIGHT

[76] Inventor: Alan L. Rosenburg, P.O. Box 297, Loveland, Colo. 80539

[21] Appl. No.: 378,382

[22] Filed: Jul. 3, 1989

Related U.S. Application Data

[63] Continuation-in-part of Ser. No. 343,930, Apr. 26, 1989, abandoned.

[51] Int. Cl.$^4$ .............................................. A01K 95/00
[52] U.S. Cl. .................................. 43/44.89; 43/44.96; 43/44.97
[58] Field of Search ................... 43/41, 42.1, 43.12, 43/44.87, 44.89, 44.96, 44.97, 43.1, 44.99

[56] References Cited

U.S. PATENT DOCUMENTS

| | | | |
|---|---|---|---|
| 3,081,574 | 3/1961 | Wise | 43/43.12 |
| 3,415,005 | 5/1966 | Gilham | 43/43.12 |
| 3,834,059 | 9/1974 | Overstreet | 43/43.12 |
| 3,854,235 | 12/1974 | Thompson | 43/43.12 |
| 4,186,907 | 2/1980 | Snodgrass | 43/43.12 |

Primary Examiner—Nicholas P. Godici
Assistant Examiner—Michael William Starkweather
Attorney, Agent, or Firm—William E. Hein

[57] ABSTRACT

A fishing line weight comprising a mixture of baking powder and a thick, liquid sweetener such as honey or corn syrup, for example, together with a trace amount of a stabilizing agent such as silicon dioxide and/or gylcerin, provides the weight necessary to cast a baited fishing line a desired distance, but dissolves in the water following the cast, thereby eliminating the disadvantages of conventional lead weights.

16 Claims, 1 Drawing Sheet

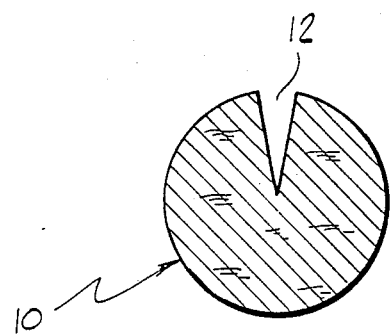

WATER SOLUBLE FISHING LINE WEIGHT

REFERENCE TO RELATED APPLICATION

This is a continuation-in-part application of application Ser. No. 07/343,930 filed on Apr. 26, 1989, now abandoned.

BACKGROUND AND SUMMARY OF THE INVENTION

This invention relates generally to fishing line weights and more specifically to a fishing line weight that dissolves in the water following casting of the fishing line. Weights added to a fishing line to allow the fisherman to throw his bait further are well known in the prior art. Lead has been the preferred metal from which fishing weights have been fabricated due to its density and softness. Many lead weights of up to a few ounces are fabricated to be generally spherical in shape but with a wedge-shaped cut that permits them to be easily pinched onto a fishing line using a pair of pliers, due to the relative softness of lead. However, lead weights have proven disadvantageous over the years in several respects. Oftentimes, when a lead weight is employed above the baited hook, the fisherman retrieves a bare hook because the lead weight prevents him from sensing a fish feeding on the bait. Also, when fishing with a tight line and a lead weight located below the baited hook, fish are reluctant to make a substantial strike when they sense the resistance caused by the lead weight on the line. The problem of snags caused by lead weights catching on submerged weeds and other debris as the line is being retrieved is a source of extreme frustration for most fishermen. Not only do such snags cause the loss of expensive lead weights, swivels, hooks, and lures and the attendant time required to re-rig the line, bu many large fish that have been hooked are lost also. In past attempts to eliminate some of these problems with lead weights, other weights have been developed, such as plastic bubbles. These plastic bubbles are designed to be filled to a desired level with water to provide the necessary weight and are adapted to be clipped or otherwise secured to the fishing line. Plastic bubbles are often used for fly fishing in a lake. However, most big fish are smart enough to recognize the unnatural appearance of a fly whose movement follows that of the bubble. In addition, plastic bubbles are subject to most of the other disadvantages that lead weights suffer.

It is, therefore, a principal object of the present invention to provide a weight for fishing line that dissolves in the water once the baited fishing line has been cast to the desired location. While such weights provide the same weight advantages as conventional lead weights to permit the fisherman to cast a desired distance, they eliminate the disadvantages stated above that are associated with lead weights. Since the water soluble weights of the present invention dissolve following the cast, they can be positioned near the bait at the end of the fishing line, thereby permitting more accurate casts and reducing the likelihood of the bait being flipped off the hook from the whipping, back-lash effect of the line between a lead sinker and the hook. In the absence of weight on the line following the cast, fish sense no resistance when approaching the bait, and the fisherman's end of the line becomes more sensitive to strikes. Expensive and time-consuming snags are substantially eliminated without a weight on the line at the time of the retrieve since the hook then represents the only possibility for snag, and the absence of weight permits the hook to ride much higher in the water, away from submerged weeds, etc. during the retrieve. When fly fishing in a lake, fish don't see any of the conventional suspicious weights, but see only the fly moving naturally through the water. In addition, the bubbles that are chemically produced during the time that the weights of the present invention are dissolving in the water serve to attract fish to the area of the bait. Environmentally and ecologically, the weights of the present invention are harmless as opposed to toxic lead weights.

BRIEF DESCRIPTION OF THE DRAWING

The drawing is a cross-sectional illustration of a dissolvable fishing weight in accordance with the present invention.

DESCRIPTION OF THE PREFERRED EMBODIMENT

Referring now to the drawing, there is shown a fishing weight 10 that is preferably generally spherical in shape and that includes a slot 12 cut to approximately the center of the weight 10 or slightly beyond. Weight 10 is attached to the fishing line by placing the line in slot 12 and then squeezing the weight 10 to clamp the sides of slot 12 against the line. Only moderate pressure that can be applied from the fisherman's fingers is required to clamp weight 10 to the line. Alternatively, weight 10 may include a hole approximately one-quarter inch in diameter completely through the approximate center of the weight 10. Weight 10 may then be secured to the line by passing the line directly through the hole therein or by the use of various conventional line knots.

Weight 10 is fabricated of ingredients that are environmentally and ecologically harmless. The principal ingredients are a water soluble substance and a bonding agent. Weight 10 is preferably fabricated from a mixture of commercially available baking powder and a thick, liquid sweetener, such as honey or corn syrup, for example, in a weight ratio within the range of two parts baking powder and one part thick, liquid sweetener to four parts baking powder and one part thick, liquid sweetener. It has been found that an ideal weight ratio is three parts baking powder to one part thick, liquid sweetener. Alternatively, weight 10 may be fabricated from a mixture of commercially available baking powder and a thick, liquid sweetener, such as honey or corn syrup, for example, in a volume ratio within the range of four parts baking powder and one part thick, liquid sweetener to six parts baking powder and one part thick, liquid sweetener. It has been found that an ideal volume ratio is five parts baking powder to one part thick, liquid sweetener. Whether the ingredients are mixed by volume or weight, as set forth above, a trace amount of silicon dioxide and/or glycerin may be added for stabilization of the resulting mixture. These ingredients are mixed until a powdery mixture having a consistency resembling finely grated cheese is achieved. This powdery mixture may then be compression molded, for example, into the desired shape by hand or by means of conventional industrial molding techniques.

In order to produce a two-thirds ounce weight, a sphere approximately one inc in diameter is required. This diameter may be scaled to produce different magnitudes of weight 10. While a spherically-shaped weight is preferred, cubes and other geometric shapes are also possible.

The weights 10 are ready for use immediately after molding to the desired shape. If more weight is desired than is provided by a single weight 10, additional weights 10 may be clamped onto the line adjacent each other. Once the line has been cast and the weight 10 contacts the water, a dissolving chemical action involving the baking powder component of weight 10 and the water begins. The one-inch diameter weight 10 will completely dissolve in about ten minutes. Alternatively, the fisherman can wait ten to fifteen seconds following his cast and then gently snap the line to pop the weight 10 free of the line. The bait may then be pulled any desired distance from the unattached, dissolving weight 10. As stated above, it has been discovered that bubbles produced during the time that the weight 10 is dissolving in the water serve to attract fish to the area. In addition, commercially available scent and coloring agents may be added to the baking powder-thick, liquid sweetener mixture to serve as additional attractants to the fish.

I claim:

1. A fishing line weight adapted for attachment to a fishing line prior to casting and for dissolving in the water following casting, the fishing line weight comprising a mixture of baking powder and honey in a ratio by volume within a range of four parts baking powder and one part honey to six parts baking powder and one part honey, the mixture being formed into a desired geometrical shape.

2. A fishing line weight as in claim 1 wherein said mixture of baking powder and honey is in the ratio by volume of five parts baking powder and one part honey.

3. A fishing-line weight as in claim 1 wherein said mixture of baking powder and honey is formed to be generally spherical in shape and to have a wedge-shaped slot therein for receiving a fishing line over which said fishing line weight is to be clamped.

4. A fishing line weight as in claim 1 further comprising a scent agent mixed with said mixture of baking powder and honey to act as an attractant for fish.

5. A fishing line weight as in claim 1 further comprising a coloring agent mixed with said mixture of baking powder and honey for imparting a desired color to said fishing line weight.

6. A fishing line weight as in claim 1 wherein said mixture of baking powder and honey further comprises silicon dioxide.

7. A fishing line weight as in claim 1 wherein said mixture of baking powder and honey further comprises glycerin.

8. A fishing line weight adapted for attachment to a fishing line prior to casting and for dissolving in the water following casting, the fishing line weight comprising a mixture of baking powder and a thick, liquid sweetener in a ratio by weight within a range of two parts baking powder and one part thick, liquid sweetener to four parts baking powder and one part thick, liquid sweetener, the mixture being formed into a desired geometrical shape.

9. A fishing line weight as in claim 8 wherein said mixture of baking powder and a thick, liquid sweetener is in the ratio by weight of three parts baking powder and one part thick, liquid sweetener.

10. A fishing line weight as in claim 8 wherein said mixture of baking powder and a thick, liquid sweetener is formed to be generally spherical in shape and to have a wedge-shaped slot therein for receiving a fishing line over which said fishing line weight is to be clamped.

11. A fishing line weight as in claim 8 wherein said mixture of baking powder and a thick, liquid sweetener is formed to be generally spherical in shape and to have an aperture therethrough for receiving a fishing line onto which said fishing line weight is to be attached.

12. A fishing line weight as in claim 8 further comprising a scent agent mixed with said mixture of baking powder and a thick, liquid sweetener to act as an attractant for fish.

13. A fishing line weight as in claim 8 further comprising a coloring agent mixed with said mixture of baking powder and a thick, liquid sweetener for imparting a desired color to said fishing line weight.

14. A fishing line weight as in claim 8 wherein said mixture of baking powder and a thick,, liquid sweetener further comprises silicon dioxide.

15. A fishing line weight as in claim 8 wherein said mixture of baking powder and a thick, liquid sweetener further comprises glycerin.

16. A fishing line weight as in claim 1 wherein said mixture of baking powder and honey is formed to be generally spherical in shape and to have an aperture therethrough for receiving a fishing line onto which said fishing line weight is to be attached.

* * * * *